Patented Mar. 28, 1950

2,501,666

UNITED STATES PATENT OFFICE 2,501,666

LIGNIN RESINS AND PROCESS OF MAKING SAME

Raymond N. Evans, Laurel, Miss., assignor to Masonite Corporation, Laurel, Miss., a corporation of Delaware No Drawing. Application August 29, 1946, Serial No. 693,818

4 Claims. (Cl. 260—17.5)

This invention relates to novel synthetic resins made from components comprising lignin in substantial proportions, and the method of making and using such resins.

By the present invention lignin and formaldehyde (or components which engender formaldehyde) are reacted in the presence of an acid catalyst with the condensation product of furfural and a ketone, and resins are formed having thermosetting characteristics, and good resistance to alkali and to absorption of water.

The resins prepared in accordance with the present invention may be used alone or together with other resinous bodies in various ways, as in the preparation of solutions for impregnating and laminating purposes or in the preparation of protective coatings and varnishes. The resins may be used with or without fillers for making molded articles. The cured resins provide strong laminating bonds and are especially effective as bonding agents in production of laminated paper, plywood, hardboard or other fibrous boards, and the like. The resins are also useful for addition to fiber materials, which are to be consolidated into sheet and other products and the final curing of the resin effected under application of heat and consolidating pressure.

In carrying out the present invention, the furfural and ketone condensation product is first prepared by reacting furfural and a ketone, having a hydrogen atom on an alpha carbon, under alkaline conditions. The reaction is carried out at relatively low temperatures, as for example 0° to 15° C.

The thus formed condensation product is mixed with lignin, formaldehyde and a strong acid catalyst and heated, preferably under reflux, at a temperature between about 60° and 110° C. Suitable strong acids which may be used are hydrochloric, phosphoric, sulfuric, oxalic, and the like. The heating is continued until the resin reaction product has advanced to a point where it has a molasses-like consistency. At this point the furfural, ketone, formaldehyde, and lignin resin is soluble in organic solvents, as for example alcohols, ketones, "Cellosolves," Carbitols, and the like. In forming the resin the reactive components are reacted simultaneously in order to obtain the proper bonding between the furfural and ketone condensation product, formaldehyde, and lignin, and to obtain uniformity in the final resin product.

When the furfural, ketone, formaldehyde, and lignin resin has been prepared and dissolved in a suitable organic solvent, as for example ethyl acetate, ethyl alcohol, methyl "Cellosolve," ethyl "Cellosolve," Carbitol, dioxane, or the like, or mixtures thereof, it is ready for use for impregnating sheet products, for mixing with fibers such as hydrolyzed ligno-cellulose fiber, or other uses. These products or materials containing the resin solution are preferably heated in an oven to substantially remove the volatiles before finally subjecting them to high heat and pressure. In the final heating and pressing operation, the resin is converted into a substantially thermo-set resin having good resistance to alkali and to water absorption.

The lignin used in the reaction is preferably provided by subjecting wood or other ligno-cellulose material to hydrolysis in the presence of mild acids. The acid-hydrolyzed ligno-cellulose material is preferably prepared by subjecting wood chips to the action of high-pressure steam in a closed chamber, as for example a gun, as described in U. S. patent to Mason, No. 1,824,221. In such treatment, organic acids such as acetic and formic acids are formed, and acid-hydrolysis of the ligno-cellulose material is effected, with lignin being set free. After treatment with steam, the contents of the gun are disintegrated, preferably by being explosively discharged from the region of high-steam pressure to a region of substantially atmospheric pressure. Material so produced has a pH of about 3 to 4.

The time required for the steam treatment decreases rapidly with increase of the steam pressure used. For example, 25 minutes treatment with steam at 275 p. s. i. (temperature of 212° C.) has approximately the same effect as treatment for 5 seconds with steam at 1000 p. s. i. (temperature of 285° C.). Fiber made by such treatment of wood chips is well adapted for production of fiber for making hardboards and like products.

In general, the longer the steam treatment is continued at a given temperature, the higher is the proportion of the freed soluble lignin, and such longer steam treatment is preferable in case the lignin is to be extracted. For example, wood chips subjected to steam raised to 600 p. s. i. in 30 seconds, then raised to 1000 p. s. i. and held for 5 seconds, followed by explosive disintegration, contains a good proportion of extractible lignin, as about 10% to 12% on dry weight of chips. Higher yields of such lignin can be extracted from ligno-cellulose material given a steam treatment of 15 or more seconds with steam at 1000 p. s. i., for example. For illustration, a typical figure for yield of soluble lignin from wood chips treated with steam at 1000 p. s. i. for 15 seconds and then disintegrated by explosive discharge is about 17% to 18% based on dry weight of chips. The steam-treated and disintegrated material is preferably washed with water to largely remove the water-soluble organic acids, such as formic and acetic, and water-soluble or water-dispersible derivatives of hemi-cellulosic material present in wood or equivalent ligno-cellulose material.

For extraction of the lignin from acid-hydrolyzed ligno-cellulose, dilute alkali solution, such as 1% to 3% sodium hydroxide solution for example, is preferably used, and the lignin precipitated by acidifying the solution, as for example by addition of hydrochloric acid, and then separated from the liquid by filtration or by other means. The separated lignin is preferably further treated with dilute mineral acid, such as hydrochloric or sulfuric, to set free any cations picked up in the process, filtered and washed with distilled water.

Instead of extracting with dilute alkali, organic solvents, such as methyl "Cellosolve" for example, can be used to dissolve the lignin, and the lignin recovered by precipitating in water or by evaporating the solvent or in other ways. Treating the entire mass of hydrolyzed ligno-cellulose with such organic solvents is expensive, and it is preferred to extract the lignin therefrom with dilute alkali solution and precipitate it and then confine the treatment with the organic solvents to the lignin material so obtained. The lignin used for resin making in examples below was prepared by treatment of acid-hydrolyzed exploded wood fiber with 3% sodium hydroxide solution at a temperature of 50° C., and precipitated with dilute hydrochloric acid, and treated and washed as above described. Such lignin when precipitated and dried is light and fluffy.

Acid-hydrolyzed ligno-cellulose fiber, for making sheet and the like products or filler material (used in the examples below), which may be used with the resins is prepared, for example, by subjecting wood or other ligno-cellulose material to the action of high-pressure steam, as described above. The hydrolysis treatment of the ligno-cellulose material is, however, generally not so severe as that applied to ligno-cellulose material which is hydrolyzed for the purpose of providing material from which to obtain lignin by extraction. The less severe hydrolysis is utilized in order to retain a better degree of fiber structure.

Other fiber, such as alpha cellulose, glass, and the like may also be used.

In making resins containing condensation products of furfural and a ketone, formaldehyde and lignin, the quantity of lignin may be varied from about 10% to 60%, preferably about 25% to 40% based on the weight of the furfural-ketone condensation product. The mole ratio of formaldehyde to the furfural-ketone condensation product should be about 1 to 1. The strong acid used as a catalyst in the reaction may be added in quantities from about 1% to 3% based on the weight of the furfural-ketone condensation product.

The following examples illustrate the preparation of the furfural, ketone, formaldehyde, and lignin resinous products in accordance with the present invention, and show the outstanding physical characteristics of such products. Parts in the examples are parts by weight.

*Example 1.*—3120 parts furfural and 1880 parts acetone were added slowly to a cold alkali solution containing 243 parts sodium hydroxide in 10,000 parts water. The alkali solution was kept close to 0° C. by means of cracked ice. The furfural and acetone reacted to form a condensation product. The alkaline solution was neutralized with hydrochloric acid and the crystallized furfural-acetone condensation product which was obtained was washed several times with water.

136 parts of the furfural-acetone condensation product were added to 30 parts lignin, 69 parts formaldehyde (37% Formalin) and about 2 parts concentrated hydrochloric acid. The mixture was heated with stirring for 19 hours at a temperature of 70° to 75° C. Upon cooling to room temperature, the resin had a consistency of about heavy molasses. The resin was dissolved in a mixture of 30% ethyl alcohol and 70% ethyl acetate. The resin solution contained 41% solids.

122 parts of the resin solution were mixed with 100 parts ground acid-hydrolyzed ligno-cellulose fiber, and during the mixing additional ethyl alcohol-ethyl acetate solvent was added to obtain thorough distribution of the resin throughout the fiber. After thorough mixing, the fibrous-resin mix was dried overnight at about 40° C. under forced draft. The volatile content was 9.4%. This resin-fiber mixture was ground to powder and the powder was further heated in an oven at 125° C. for 30 minutes, reducing the volatile content to less than 1%.

A specimen was prepared by placing the resin-fiber mixture in a mold and heating and pressing at a temperature of 165° C. and a pressure of 1750 p. s. i. for a period of 5 minutes, and releasing the pressure.

The molded specimen has the following characteristics:

| | |
|---|---:|
| Specific gravity | 1.35 |
| Modulus of rupture, p. s. i | 7,980 |
| Rockwell hardness (M Scale): | |
| Room temperature | 110 |
| 105° C | 42 |
| Water immersion (24 hours): | |
| Per cent uptake | 1.5 |
| Per cent swell | .8 |
| 1% alkali immersion (24 hours): | |
| Per cent uptake | 1.7 |
| Per cent swell | 1.7 |

*Example 2.*—Another specimen was prepared by placing the resin-fiber mixture containing less than 1% volatiles, as prepared in Example 1, in a mold and heating and pressing at a temperature of 165° C. and a pressure of 1750 p. s. i. for a period of 5 minutes, and chilling the sample while held under said pressure.

The molded specimen had the following characteristics:

| | |
|---|---:|
| Specific gravity | 1.38 |
| Modulus of rupture, p. s. i | 8,640 |
| Rockwell hardness (M Scale): | |
| Room temperature | 113 |
| 105° C | 60 |
| Water immersion (24 hours): | |
| Per cent uptake | .5 |
| Per cent swell | .3 |
| 1% alkali immersion (24 hours): | |
| Per cent uptake | 1.4 |
| Per cent swell | 1.8 |

*Example 3.*—45 parts of the ethyl alcohol and ethyl acetate resin solution (containing 41% solids) as prepared in Example 1 were added to 90 parts acid-hydrolyzed ligno-cellulose fiber stock at 3% consistency (proportion of fiber to water). The stock was formed into a sheet product, cold squeezed and dried overnight at 40° C. in a current of air, and then further heated for 1½ hours at 125° C. The volatile contents were less than 1%.

A hardboard product was prepared by placing the sheet in a press and heating and pressing at a temperature of 165° C. and a pressure of 1750 p. s. i. for a period of 5 minutes, and chilling while held under said pressure.

The hardboard product had the following characteristics:

| | |
|---|---:|
| Specific gravity | 1.39 |
| Modulus of rupture, p. s. i | 11,500 |
| Rockwell hardness (M Scale): | |
|     Room temperature | 105 |
|     105° C | 58 |
| Water immersion (24 hours): | |
|     Per cent uptake | .9 |
|     Per cent swell | .9 |
| 1% alkali immersion (24 hours): | |
|     Per cent uptake | 6.9 |
|     Per cent swell | 8.0 |

It is to be understood that the specific data and procedures given are for illustration only and not for limitation; and the breadth of the invention is defined in the claims.

I claim:

1. A resinous product which comprises the heat reaction product under acid conditions of lignin, formaldehyde and a condensation product of furfural and acetone, said lignin being present in an amount equal to 10% to 60% based on the weight of the furfural-acetone condensation product and the molal ratio of formaldehyde to the furfural-acetone condensation product being about 1 to 1.

2. A fiber resinous product which comprises acid hydrolyzed lignocellulose fiber and the heat reaction product under acid conditions of lignin, formaldehyde and a condensation product of furfural and acetone, said lignin being present in an amount equal to 10% to 60% based on the weight of the furfural-acetone condensation product and the molal ratio of formaldehyde to the furfural-acetone condensation product being about 1 to 1.

3. The process of preparing a resinous material which comprises heating under acid conditions lignin, formaldehyde and the condensation product of furfural and acetone, said lignin being present in an amount equal to 10% to 60% based on the weight of the furfural-acetone condensation product and the molal ratio of formaldehyde to the furfural-acetone condensation product being about 1 to 1.

4. The process of preparing a fiber resinous product which comprises heating under acid conditions lignin, formaldehyde, and the condensation product of furfural and acetone to form a resinous product, said lignin being present in an amount equal to 10% to 60% based on the weight of the furfural-acetone condensation product and the molal ratio of formaldehyde to the furfural-acetone condensation product being about 1 to 1, mixing the resinous product with acid hydrolyzed lignocellulose fiber, and subjecting the mixture to heat and pressure.

RAYMOND N. EVANS.

REFERENCES CITED

The following references are of record in the file of this patent:

UNITED STATES PATENTS

| Number | Name | Date |
|---|---|---|
| 1,932,255 | Sherrard | Oct. 24, 1933 |
| 2,197,724 | Hovey | Apr. 16, 1940 |
| 2,363,829 | Caplan | Nov. 28, 1944 |
| 2,365,833 | Morrill | Dec. 26, 1944 |
| 2,367,312 | Reineck | Jan. 16, 1945 |

OTHER REFERENCES

Report on the Third International Conference on Timber Utilization, Paris, July 26–28, 1937. No. 16/17 Special No. 1937, page 95.